United States Patent
Kim et al.

(10) Patent No.: US 10,788,727 B2
(45) Date of Patent: Sep. 29, 2020

(54) LIQUID CRYSTAL LIGHT DEFLECTOR

(71) Applicant: SAMSUNG ELECTRONICS CO., LTD., Suwon-si (KR)

(72) Inventors: Young Kim, Yongin-si (KR); Yunhee Kim, Seoul (KR); Hoon Song, Yongin-si (KR); Kanghee Won, Seoul (KR); Yeonhee Kim, Seoul (KR); Kideok Bae, Seoul (KR); Hongseok Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 168 days.

(21) Appl. No.: 15/809,569

(22) Filed: Nov. 10, 2017

(65) Prior Publication Data

US 2018/0129105 A1    May 10, 2018

(30) Foreign Application Priority Data

Nov. 10, 2016  (KR) .......................... 10-2016-0149564

(51) Int. Cl.
| | | |
|---|---|---|
| *G02F 1/29* | (2006.01) | |
| *G02F 1/31* | (2006.01) | |
| *G02B 30/00* | (2020.01) | |
| *G02B 30/22* | (2020.01) | |
| *G02B 30/27* | (2020.01) | |

(52) U.S. Cl.
CPC ............... *G02F 1/29* (2013.01); *G02B 30/00* (2020.01); *G02B 30/22* (2020.01); *G02B 30/27* (2020.01); *G02F 1/31* (2013.01)

(58) Field of Classification Search
CPC ............... G02F 1/29; G02F 1/13706; G02F 2001/133738; G02F 2001/133776; G02F 1/1345; G02F 1/13452; G02F 1/13458

See application file for complete search history.

(56) References Cited

U.S. PATENT DOCUMENTS

| | | | |
|---|---|---|---|
| 6,169,594 | B1 | 1/2001 | Aye et al. |
| 6,643,054 | B1 | 11/2003 | Weidlich |
| 7,167,230 | B2 | 1/2007 | Klaus et al. |
| 2003/0095400 | A1 | 5/2003 | Kashima et al. |
| 2005/0078237 | A1 | 4/2005 | Klaus et al. |
| 2012/0206667 | A1 | 8/2012 | Kroll et al. |
| 2013/0258711 | A1 | 10/2013 | Okuyama et al. |
| 2014/0104521 | A1* | 4/2014 | Nishimura .......... G02F 1/13306 349/33 |
| 2014/0138022 | A1* | 5/2014 | Bae .................... G02F 1/134309 156/267 |

(Continued)

*Primary Examiner* — Thanh Nhan P Nguyen
(74) *Attorney, Agent, or Firm* — Sughrue Mion, PLLC

(57) ABSTRACT

A liquid crystal light deflector includes a first electrode layer including a plurality of pattern electrodes arranged with a constant pitch in a first direction on a first substrate, a first alignment layer covering the first electrode layer and having a plurality of concave portions formed on an upper surface thereof and extending in parallel to a second direction perpendicular to the first direction, a liquid crystal layer including a plurality of liquid crystal molecules each having a long diameter substantially parallel to the concave portions on the first alignment layer, a second electrode layer, which is a common electrode, disposed on the liquid crystal layer, and a second substrate disposed on the second electrode layer.

13 Claims, 3 Drawing Sheets

(56) References Cited

U.S. PATENT DOCUMENTS

2015/0146125 A1* 5/2015 Kita .................. G02F 1/133707
349/43
2015/0293402 A1 10/2015 Shinkai et al.

* cited by examiner

LIQUID CRYSTAL LIGHT DEFLECTOR

CROSS-REFERENCE TO RELATED APPLICATION

This application claims priority from Korean Patent Application No. 10-2016-0149564, filed on Nov. 10, 2016, in the Korean Intellectual Property Office, the disclosure of which is incorporated herein in its entirety by reference.

BACKGROUND

1. Field

Apparatuses consistent with exemplary embodiments relate to liquid crystal light deflectors of a display apparatus.

2. Description of the Related Art

In the current information age, the demand for displays of various types has increased. Light deflectors that change a travelling direction of light have been typically manufactured to include optical devices, such as lenses or mirrors. In such cases, the volume of the light deflector is large and a speed of a change of angle of the light is limited. Therefore, studies have been conducted regarding light deflectors that use a light deflection panel that changes a travelling direction of light based on an electrical signal. Such a light deflector may be used for a display apparatus that displays a 2D image, a 3D image, or a holographic image.

A holographic display apparatus displays a three-dimensional image by sending a transformed image signal to both eyes of a user by using an optical system after first transforming a general image signal into a holographic image signal. A light deflector is used to deflect an image to the eyes of the user. The light deflector may change the travelling direction of light based on an electrical signal.

The light deflector may include a microelectromechanical system (MEMS) scanner, a galvanic mirror, a linear spatial light modulator (SLM), and a liquid crystal light deflector. Of these light deflectors, a liquid crystal light deflector is a small-sized light deflector.

However, related art light deflectors provide only a small deflection angle of light.

SUMMARY

One or more exemplary embodiments may provide slim and small sized liquid crystal light deflectors configured to change phase.

Additional exemplary aspects and advantages will be set forth in part in the description which follows and, in part, will be apparent from the description, or may be learned by practice of the presented exemplary embodiments.

According to an aspect of an exemplary embodiment, a liquid crystal light deflector includes: a first electrode layer including a plurality of pattern electrodes arranged with a constant pitch in a first direction on a first substrate; a first alignment layer that covers the first electrode layer and has a plurality of concave portions formed in an upper surface thereof in parallel to a second direction perpendicular to the first direction; a liquid crystal layer including a plurality of liquid crystal molecules each having a long diameter substantially parallel to the concave portions on the first alignment layer; a second electrode layer disposed on the liquid crystal layer, wherein the second electrode is a common electrode; and a second substrate disposed on the second electrode layer.

The first electrode layer may include a plurality of electrode units, wherein each of the electrode units includes n pattern electrodes including an $i_{th}$ pattern electrode which is electrically connected to the $i_{th}$ pattern electrode of each of the plurality of electrode units.

The n may be 720 or 1024, and a number of the electrode units may be in a range from 7 to 10.

The liquid crystal light deflector may further include n line electrodes including an $i_{th}$ line electrode which electrically connects the $i_{th}$ pattern electrode of each electrode units.

The n line electrodes may be arranged in parallel to the second direction.

The liquid crystal light deflector may further include n electrode pads. One of the $i_{th}$ pattern electrodes may include an extension unit and the extension unit may be electrically connected to a corresponding electrode pad of the n electrode pads.

The n electrode pads may be spaced at substantially equidistant intervals.

The liquid crystal light deflector may further include: an insulating layer disposed on the pattern electrodes; first via holes formed in the insulating layer in positions respectively corresponding to positions of the $i_{th}$ pattern electrodes of each of the electrode units. A via metal may fill each of the plurality of via holes, and the $i_{th}$ line electrode may be disposed on the insulating layer and may be connected to the via metal.

The insulating layer may cover the n electrode pads, and a plurality of second via holes may be formed in the insulating layer in positions respectively corresponding to positions of the n electrode pads, and the n electrode pads may be electrically connected to a driving integrated circuit (IC) through the plurality of second via holes.

The liquid crystal light deflector may further include a second alignment layer disposed on a surface of the second electrode layer facing the first substrate. The second alignment layer may include a plurality of concave portions formed therein, wherein the plurality of concave portions may extend parallel to the second direction.

Each of the n pattern electrodes may have a substantially same width.

The liquid crystal molecules may be positive liquid crystal molecules, and the liquid crystal molecules may move into an orientation in which the long diameter is oriented in a direction substantially normal vertical to a plane of the first substrate according to a voltage applied to the pattern electrodes.

In the liquid crystal layer, a voltage applied to the pattern electrodes forms an optical path conversion surface which controls an output direction of a laser beam incident onto the first electrode layer.

BRIEF DESCRIPTION OF THE DRAWINGS

These and/or other exemplary aspects and advantages will become apparent and more readily appreciated from the following description of the exemplary embodiments, taken in conjunction with the accompanying drawings in which.

DETAILED DESCRIPTION

Figure 1:
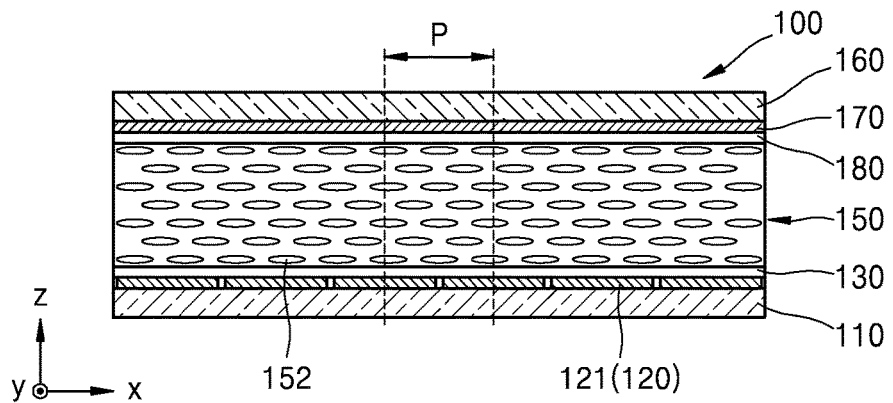
FIG. 1 is a schematic cross-sectional view of a liquid crystal light deflector according to an exemplary embodiment.

Reference will now be made in detail to exemplary embodiments which are illustrated in the accompanying drawings. In the drawings, thicknesses of layers and regions may be exaggerated for clarification of the specification. The example embodiments of the inventive concept are capable of various modifications and may be embodied in many different forms.

It will be understood that when an element or layer is referred to as being "on" or "above" another element or layer may include when an element or a layer is directly or indirectly on the other element or layer.

FIG. 1 is a schematic cross-sectional view of a liquid crystal light deflector 100 according to an exemplary embodiment.

Referring to FIG. 1, the liquid crystal light deflector 100 may include a first substrate 110 and a second substrate 160 disposed in parallel to each other and facing each other. A first electrode layer 120 is formed on the first substrate 110 and a second electrode layer 170 is formed on the second substrate 160. The first electrode layer 120 and the second electrode layer 170 face each other. The first substrate 110 and the second substrate 160 may be insulating substrates. The first substrate 110 and the second substrate 160 may each include glass or plastic.

The first electrode layer 120 may include a plurality of pattern electrodes 121. The pattern electrodes 121 may be arranged in parallel. The pattern electrodes 121 may be arranged in a first direction (an x direction) with a constant pitch P. For example, the pitch P of the pattern electrodes 121 may be approximately 2 µm. Since the pitch P is comparatively small, a light deflection angle of the liquid crystal light deflector 100 may be increased. The pattern electrodes 121 may each have the same width. The width of each of the pattern electrodes 121 may be approximately 1.5 µm, as measured in the x direction, as shown in FIG. 1, and a length of each the pattern electrodes 121 may be approximately 14 mm, as measured in the y direction, as shown in FIG. 1. The first electrode layer 120 may include, for example, 7,200 pattern electrodes 121. In FIG. 1, 6 pattern electrodes 121 are depicted for convenience of explanation. The pattern electrodes 121 are arranged such that the length direction thereof is oriented parallel to the second direction (the y direction).

The pattern electrodes 121 may include a transparent conductive material. For example, the pattern electrodes 121 may include indium-tin-oxide (ITO), indium-zinc-oxide (IZO), or indium-tin-zinc-oxide (ITZO).

The second electrode layer 170 may be a flat type common electrode. However, the current exemplary embodiment is not limited thereto. For example, the second electrode layer 170 may include a plurality of pattern electrodes similar to the first electrode layer 120. In this case, the same voltage may be applied to each of the pattern electrodes of the second electrode layer 170. The second electrode layer 170 may include a transparent conductive material similar to the first electrode layer 120.

Figure 2:
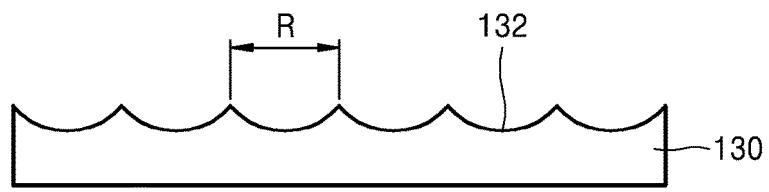
FIG. 2 is a side cross-sectional view schematically showing a structure of a first alignment layer of the liquid crystal light deflector of FIG. 1, according to an exemplary embodiment.

A first alignment layer 130 covering the first electrode layer 120 may be disposed on the first substrate 110. FIG. 2 is a side cross-sectional view schematically showing a structure of the first alignment layer 130 of the liquid crystal light deflector 100 of FIG. 1, according to an exemplary embodiment. Concave portions 132 are arranged on an upper surface of the first alignment layer 130 such that the length direction thereof is oriented parallel to the first direction (the x direction). The concave portions 132 are arranged such that their lengths are substantially perpendicular to the lengths of the pattern electrodes 121. The concave portions 132 may have a semi-circular shape and may have a diameter R of approximately a few hundreds of µm.

A liquid crystal layer 150 including liquid crystal molecules 152 is arranged on the first alignment layer 130. Long diameters of the liquid crystal molecules 152 are aligned in the first direction (the x direction). In FIG. 1, approximately two liquid crystal molecules 152 are arranged in the first direction (the x direction), per pitch P, for convenience of drawing. However, a plurality of the liquid crystal molecules 152 may be arranged in the first direction per each pitch measurement.

A second alignment layer 180 may be formed between the liquid crystal layer 150 and the second electrode layer 170. Concave portions, like the concave portions 132 of the first alignment layer 130, may be formed on a surface of the second alignment layer 180 that contacts the liquid crystal layer 150. The concave portions of the second alignment layer 180 may be formed with a direction of their length oriented in the first direction (the x direction). The concave portions of the second alignment layer 180 may be thus formed in the x direction substantially perpendicular to the lengths of the pattern electrodes 121 of the first electrode layer 120.

The first alignment layer 130 and the second alignment layer 180 may include polyimide.

A plurality of spacer balls (not shown) may be disposed between the first alignment layer 130 and the second alignment layer 180. The spacer balls may each have a diameter in a range from about 2.5 µm to about 3 µm. The spacer balls maintain a constant distance between the first alignment layer 130 and the second alignment layer 180. The spacer balls may include a polymer material.

The liquid crystal molecules 152 may be positive liquid crystal molecules. When a predetermined voltage is applied between the pattern electrodes 121 of the first electrode layer 120 and the second electrode layer 170 after the positive liquid crystal molecules become arranged in the x direction, substantially perpendicular to the length direction of the pattern electrodes 121, according to a magnitude of the applied voltage, positions of the liquid crystal molecules 152 are changed to be substantially perpendicular to the first substrate 110. Accordingly, a phase modulation occurs in light incident onto the first electrode layer 120.

The liquid crystal light deflector 100 according to the current exemplary embodiment uses pattern electrodes having a comparatively small width, and therefore, the liquid crystal layer may be thin, thereby having a slim and small size.

Figure 3:
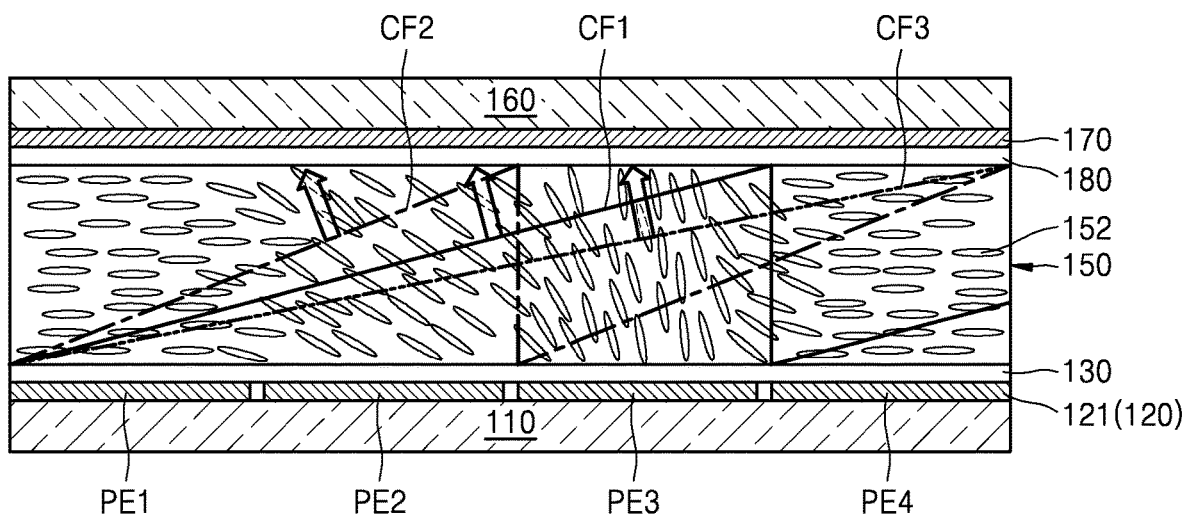
FIG. 3 is a schematic cross-sectional view for explaining an operation of a liquid crystal light deflector according to an exemplary embodiment.
Figure 3:
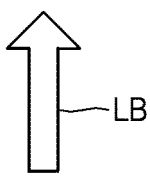

FIG. 3 is a schematic cross-sectional view for explaining an operation of a liquid crystal light deflector according to an exemplary embodiment Like reference numerals are used to indicate elements that are substantially identical to the elements of FIG. 1, and thus the detailed description thereof will not be repeated.

In FIG. 3, first through fourth pattern electrodes PE1 through PE4 of the liquid crystal light deflector 100 are depicted as disposed on the first substrate 110 for convenience of explanation. The first through fourth pattern electrodes PE1 through PE4 represent four consecutively disposed pattern electrodes 121. An electric field is formed in a corresponding pattern electrode region by a difference of voltage applied between each of the first through fourth pattern electrodes PE1 through PE4 and the common electrode 170. When a ground voltage is applied to the common electrode 170 and 0V is applied to the first pattern electrode PE1, the liquid crystal molecules 152 may be arranged in the concave portions 132, substantially parallel to the first substrate. That is, when 0V is applied to the first pattern electrode PE1, the liquid crystal molecules 152 may not move and the initial arrangement thereof may be maintained.

As the voltage (hereinafter, a first applied voltage) applied to the pattern electrodes 121 is increased, the liquid crystal molecules 152 move to be aligned in a direction substantially perpendicular to the first substrate 110. When the first applied voltage reaches a critical voltage, the liquid crystal molecules 152 are arranged substantially perpendicular to the first substrate 110. In FIG. 3, the critical voltage was applied to the third pattern electrode PE3, and the critical voltage is, for example, 5V. A voltage of 2.5V was applied to the second pattern electrode PE2. According to the increase in the voltage applied to the first through fourth pattern electrodes PE1 through PE4, the retardation of incident light is increased, and accordingly, a phase of the light incident onto the corresponding pattern electrodes 121 may be retarded. When the liquid crystal molecules 152 are arranged substantially perpendicular to the first substrate 110 as a result of applying a critical voltage to a corresponding pattern electrode, the phase retardation of the light incident onto the corresponding electrode region may be $2\pi$.

As the voltage applied to the first through fourth pattern electrodes PE1 through PE4 is increased, the magnitude of retardation of light is increased. An optical path conversion surface CF1 is formed in a predetermined region (in FIG. 3, in three pattern electrode regions). That is, a pseudo prism may be formed. An arrangement of a plurality of such pseudo prisms is repeated along the first direction (the x direction) of the liquid crystal light deflector 100. The number (m number) of pattern electrodes 121 that form a single pseudo prism may vary according to the voltages applied to the pattern electrodes 121. That is, when 0V and a critical voltage of 5V are applied to two adjacent pattern electrodes 121, a single pseudo prism is formed per the two pattern electrodes 121. That is, an optical path conversion surface CF2, which is indicated by the alternated long-and-short dashed line, is formed per the two pattern electrodes 121. Here, m is an integer and may be one of 2 to n. Here, n is an integer, and as described below, the n number of pattern electrodes 121 configure a single unit electrode.

When multiple voltages are applied to the first through fourth pattern electrodes PE1 through PE4, that is, 0V, 5/3V, 10/3V, and 5V are respectively applied to the first through fourth pattern electrodes PE1 through PE4, a single optical path conversion surface CF3 (alternate long and two short dashed line in FIG. 3) per the four pattern electrodes is formed.

That is, when the voltage application to the m pattern electrodes 121 is increased from 0V, applied to a first electrode, to the critical voltage (5V), applied to an $m_{th}$ electrode, a single pseudo prism may be formed on the regions of the m pattern electrodes 121.

A laser beam LB incident onto the first substrate 110 is deflected at the optical path conversion surfaces CF1 through CF3 and is emitted. The laser beam LB may be one of red light, green light, and blue light. Refractive indexes of the optical path conversion surfaces CF1 through CF3 may be controlled by controlling the voltages applied to the pattern electrodes 121, and thus, an emission angle of light passing through the liquid crystal layer 150 may be controlled. That is, since the optical path of light is converted by the voltages applied to the pattern electrodes 121, the pattern electrodes 121 may perform a light deflection function. When the light deflection function of the pattern electrodes 121 is used, the red light, green light, and the blue light may all be emitted in the same direction.

Figure 4:
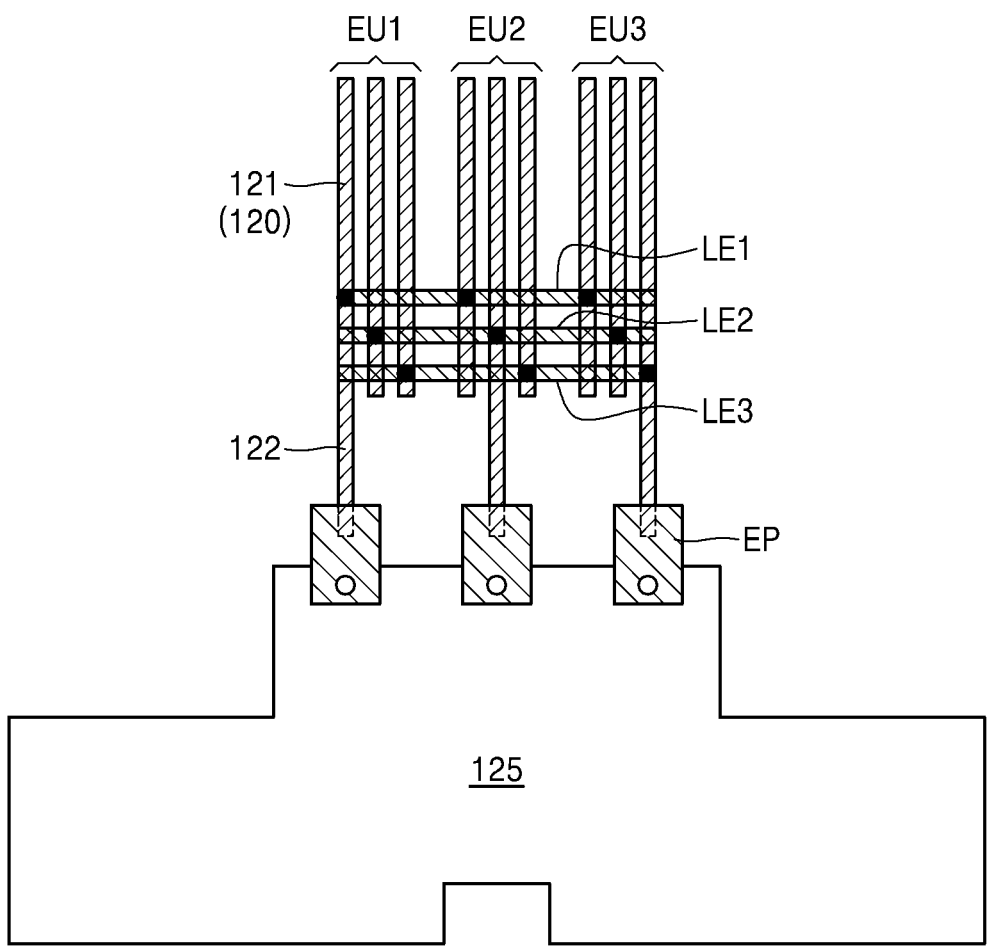
FIG. 4 is a plan view showing an arrangement of pattern electrodes of a first electrode layer of a liquid crystal light deflector according to an exemplary embodiment.

FIG. 4 is a plan view showing an arrangement of pattern electrodes 121 of the first electrode layer 120 of the liquid crystal light deflector 100 according to an exemplary embodiment. For convenience of explanation, certain elements are not illustrated.

Referring to FIG. 4, the first electrode layer 120 may include a plurality of pattern electrodes 121. The pattern electrodes 121 may be divided into a plurality of, for example, 10 electrode units. Each of the electrode units may include 720 pattern electrodes. The 720 pattern electrodes may correspond to 720 channels of a driving integrated circuit (IC) used in a connected electronic device, for example, a holographic display. If a driving IC includes 1024 channels, each of the electrode units may include 1024 pattern electrodes. Hereinafter, a case of the first electrode layer 120 including 7,200 pattern electrodes will be described as an example.

In the liquid crystal light deflector 100 according to the current exemplary embodiment, the pattern electrodes 121 each have a small width, that is, approximately 2 μm, thus the light deflection angle is increased, and since the number of pattern electrodes 121 included in single electrode unit region is increased, the resolution of a display apparatus that employs the liquid crystal light deflector 100 is increased. In the current exemplary embodiment, the use of 10 electrode units is to increase the incident efficiency of a laser beam incident onto the liquid crystal light deflector 100 by making a diameter of the laser beam as big as 14 mm. That is, when 720 pattern electrodes, each having a width of 2 μm, are used in the first electrode layer 120, then a length of the first electrode layer for incident light is 1.4 mm, and the number of wave guides to be used is 10 times greater than a case in which the diameter of the laser beam is 14 mm. When 10 electrode units are used as in the current exemplary embodiment, the diameter of a laser beam incident onto the first electrode layer 120 may be increased, and accordingly, the number of wave guides required for reducing the laser beam is reduced, thereby increasing the efficiency of using a laser beam.

In FIG. 4, for convenience of explanation, it is depicted that the first electrode layer 120 includes first through third electrode units EU1 through EU3, each including three pattern electrodes 121.

The $i_{th}$ pattern electrodes 121 of each of the first through third electrode units EU1 through EU3 are electrically connected to each other by an $i_{th}$ line electrode LE. Three black circles connected to the $i_{th}$ line electrode LE indicate via metals (refer to 220 of FIG. 5D) that connect the $i_{th}$ pattern electrodes 121 and the $i_{th}$ line electrode LE.

One of the 10 pattern electrodes 121 connected to the $i_{th}$ line electrode LE includes an extension unit 122 for connecting to the outside. That is, the first electrode layer 120 includes 720 extension units 122. The extension units 122 may be arranged with a constant spacing therebetween. For example, the extension units 122 may be arranged with a distance of ten pattern electrodes 121 (20 μm) therebetween. In this case, the extension units 122 of the first unit electrode EU1 may be the 1st, 11th, 21th, . . . 711th extension units 122 of the pattern electrodes 121, and the extension units 122 of the second unit electrode EU2 may be the 2nd, 22nd, 32nd, . . . 712th extension units 122 of the pattern electrodes 121. In this manner, 720 extension units 122 may be formed.

Each of the extension units 122 is connected to a corresponding electrode pad EP. That is, there are 720 electrode pads EP. The electrode pads EP may include a metal, for example, Mo.

The electrode pads EP are bonded to a driving IC 125. Circles on the electrode pads EP indicate electrical connection units connecting the electrode pads EP to the driving IC 125. The circles are regions where an anisotropic conductive film bonding is performed through a second via hole H2 of FIG. 5E, which will be described below.

A voltage may be individually applied to each of the 720 line electrodes LE through the 720 electrode pads EP. As a result, a desired voltage may be applied to the 720 pattern electrodes 121 in each of the electrode units. Accordingly, light deflection may be performed by forming an electrical pseudo prism of a desired size in each of the electrode units.

FIGS. 5A through 5E are cross-sectional views for explaining a method of connecting the pattern electrodes 121 and the electrode pads EP of the liquid crystal light deflector 100 according to an exemplary embodiment. Like reference numerals are used to indicate elements that are substantially identical to the elements of FIGS. 1 and 4.

Figure 5A:
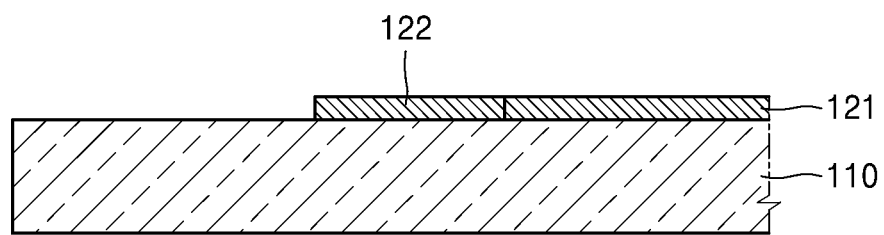
FIGS. 5A through 5E are cross-sectional views for explaining a method of connecting electrode patterns and electrode pads of a liquid crystal light deflector according to an exemplary embodiment.

Referring to FIG. 5A, after coating the first substrate 110 with an ITO material, a plurality of pattern electrodes 121 are formed by patterning the ITO material. The number of the pattern electrodes 121 may be 7,200. During the patterning, 720 extension units 122 are formed to be extended from 720 selected pattern electrodes 121. The extension units 122 may be formed with equidistant intervals therebetween. The extension units 122 may be arranged with a distance of approximately 20 μm therebetween. A pitch of the pattern electrodes 121 is 2 μm, and a stepper equipment (hereinafter, "a stepper") that may etch the ITO material to less than 1 μm is used for patterning of the pattern electrodes 121.

Figure 5B:
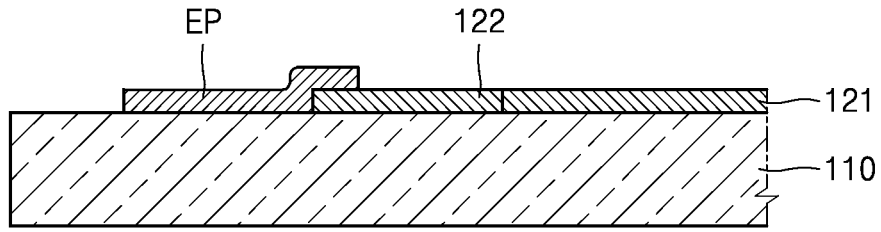

Referring to FIG. 5B, electrode pads EP contacting the extension units 122 are formed on the first substrate 110. The electrode pads EP may include Mo. At this point, an aligner equipment (hereinafter, "an aligner") may be used. Since the critical line width of the aligner is approximately 5 μm, the aligner may be used for forming the electrode pads EP with a distance of 20 μm therebetween.

Figure 5C:
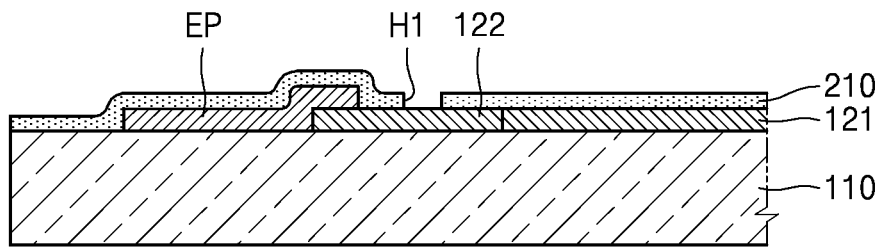

Referring to FIG. 5C, an insulating layer 210 covering the pattern electrodes 121 and the electrode pads EP is formed on the first substrate 110. The insulating layer 210 may include silicon oxide.

First via holes H1 that expose the extension units 122 are formed in the insulating layer 210. Ten first via holes H1 that expose the $i_{th}$ pattern electrodes 121 in each of the electrode units are arranged linearly.

Figure 5D:
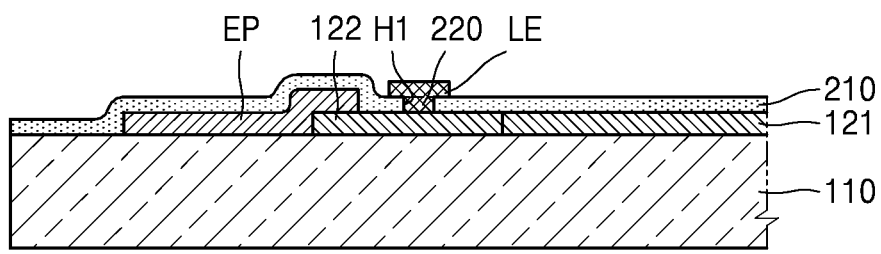

Referring to FIG. 5D, the first via holes H1 are filled with a via metal 220, and $i_{th}$ line electrodes LE that connect the corresponding via metal 220 are formed on the insulating layer 210. 720 line electrodes LE that are parallel to each other are formed. The line electrodes LE are formed to perpendicular to the pattern electrodes 121.

Figure 5E:
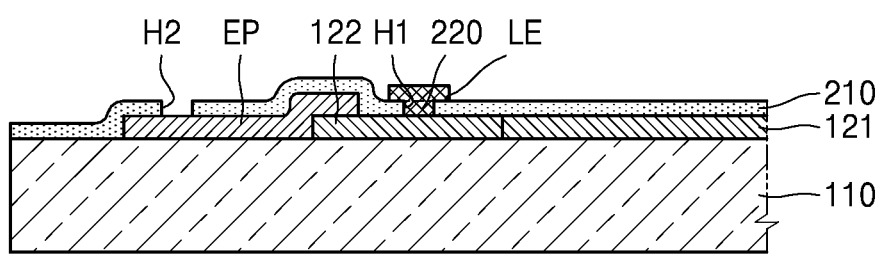

Referring to FIG. 5E, second via holes H2 that expose the electrode pads EP are formed in the insulating layer 210. Next, the electrode pads EP and a driving IC 125 are connected by using an anisotropic conductive film bonding method. A voltage applied from the driving IC is applied to the corresponding $i_{th}$ pattern electrodes 121 of each of the electrode units through the corresponding electrode pad EP and the extension units 122.

Hereinafter, a method of manufacturing the liquid crystal light deflector 100, according to an exemplary embodiment, is described with reference to FIGS. 1 through 5.

First, a first substrate 110 is prepared. The manufacturing process of the first electrode layer 120 and the electrode pads EP on the first substrate 110 is described with reference to FIGS. 5A through 5E.

The first electrode layer 120 is formed on the first substrate 110. The first electrode layer 120 includes a plurality of pattern electrodes 121 and extension units 122. The line electrodes LE1 through LE3 are formed above the pattern electrodes 121, and the electrode pads EP are connected to the extension units 122. The driving IC 125 is connected to the electrode pads EP by using an anisotropic conductive film bonding method.

Next, the first alignment layer 130, having a plurality of concave portions 132 therein, is arranged on the first electrode layer 120.

A second substrate 160 is prepared separately from the preparation of the first substrate 110. The second electrode layer 170 is arranged on the second substrate 160, and the second alignment layer 180, having a plurality of concave portions therein, is arranged on the second electrode layer 170.

A plurality of spacer balls are distributed on the first substrate 110. Next, the prepared second substrate 160 is arranged on the spacer balls.

The liquid crystal layer 150 is formed by injecting the liquid crystal molecules 152 between the first alignment layer 130 and the second alignment layer 180. As a result, the liquid crystal light deflector 100 according to the current exemplary embodiment is manufactured.

In a liquid crystal light deflector according to the current exemplary embodiment, concave portions are formed on a surface of a first alignment layer in a direction (a second direction—y direction) perpendicular to an arrangement direction (a first direction—the x direction) of pattern electrodes, and thus, liquid crystal molecules are arranged in the second direction (the y-direction). Accordingly, the liquid crystal molecules move into a position in which they are aligned substantially perpendicularly with respect to the first substrate according to a voltage applied to the pattern electrodes of the first electrode layer, and as a result, a phase modulation occurs. Transparency with respect to incident light is maintained constant in a phase modulation process.

Also, since a width of the pattern electrodes is small, a deflection angle of the liquid crystal light deflector according to the current exemplary embodiment may be increased.

Also, due to the increased number of pattern electrodes, a resolution of a display apparatus that employs a light deflector according to the current exemplary embodiment may be increased. Also, since the liquid crystal layer has a small thickness, a slim light deflector may be manufactured.

Also, since a plurality of electrode units, each including a plurality of pattern electrodes are arranged to receive incident laser beam, a light width of the incident laser beam to a first electrode layer is kept wide, and thus, efficiency of using the laser beam may be increased.

While one or more exemplary embodiments have been described with reference to the figures, it will be understood by those of ordinary skill in the art that various changes in form and details may be made therein without departing from the spirit and scope as defined by the following claims.

What is claimed is:

1. A liquid crystal light deflector comprising:
a first electrode layer disposed on a first substrate, the first electrode layer comprising a plurality of pattern electrodes arranged with a constant pitch in a first direction;
a first alignment layer that covers the first electrode layer and comprises a plurality of concave portions formed in an upper surface thereof, wherein the plurality of concave portions extend parallel to a second direction, perpendicular to the first direction;
a liquid crystal layer disposed on the first alignment layer, wherein the liquid crystal layer comprises a plurality of liquid crystal molecules, each having a long diameter oriented in the second direction;
a second electrode layer disposed on the liquid crystal layer, wherein the second electrode layer is a common electrode;
a second substrate disposed on the second electrode layer; and
a plurality of electrode pads,
wherein each electrode pad from among the plurality of electrode pads is electrically connected to a predetermined number of pattern electrodes from among the plurality of pattern electrodes,
wherein each electrode pad from among the plurality of electrode pads is electrically connected to at least two of the plurality of pattern electrodes, and
wherein each pattern electrode connected to a first electrode pad from among the plurality of electrode pads is separated from each other pattern electrode connected to the first electrode pad such that at least one pattern electrode that is not connected to the first electrode pad is positioned therebetween.

2. The liquid crystal light deflector of claim 1, further comprising:
a second alignment layer disposed on a surface of the second electrode layer facing the first substrate,
wherein the second alignment layer comprises a plurality of concave portions formed therein, wherein the plurality of concave portions of the second alignment layer extend parallel to the second direction.

3. The liquid crystal light deflector of claim 1, wherein each pattern electrode from among the plurality of pattern electrodes has a substantially same width.

4. The liquid crystal light deflector of claim 1, wherein the plurality of liquid crystal molecules are positive liquid crystal molecules and the plurality of liquid crystal molecules move into an orientation in which the long diameter is oriented in a direction substantially normal to a plane of the first substrate according to a voltage applied to the plurality of pattern electrodes.

5. The liquid crystal light deflector of claim 4, wherein, in the liquid crystal layer, the voltage applied to the pattern electrodes forms an optical path conversion surface which controls an output direction of a laser beam incident onto the first electrode layer.

6. A liquid crystal light deflector comprising:
a first electrode layer disposed on a first substrate, the first electrode layer comprising a plurality of pattern electrodes arranged with a constant pitch in a first direction;
a first alignment layer that covers the first electrode layer and comprises a plurality of concave portions formed in an upper surface thereof, wherein the plurality of concave portions extend parallel to a second direction, perpendicular to the first direction;
a liquid crystal layer disposed on the first alignment layer, wherein the liquid crystal layer comprises a plurality of liquid crystal molecules, each having a long diameter oriented in the second direction;
a second electrode layer disposed on the liquid crystal layer, wherein the second electrode layer is a common electrode; and
a second substrate disposed on the second electrode layer,
wherein the first electrode layer comprises a plurality of electrode units, wherein each of the plurality of electrode units comprises n pattern electrodes including an $i_{th}$ pattern electrode electrically connected to $i_{th}$ pattern electrodes of each other of the plurality of electrode units.

7. The liquid crystal light deflector of claim 6, wherein n is one of 720 and 1024, and a number of the plurality of electrode units is in a range from 7 to 10.

8. The liquid crystal light deflector of claim 6, further comprising n line electrodes including an $i_{th}$ line electrode which is electrically connected to the $i_{th}$ pattern electrode of each of the plurality of electrode units.

9. The liquid crystal light deflector of claim 8, wherein each of the n line electrodes is arranged in parallel to the second direction.

10. The liquid crystal light deflector of claim 9, further comprising n electrode pads,
wherein one of the $i_{th}$ pattern electrodes of the plurality of electrode units comprises an extension unit, and
wherein the extension unit is electrically connected to one corresponding electrode pad of the n electrode pads.

11. The liquid crystal light deflector of claim 10, wherein the n electrode pads are spaced at substantially equidistant intervals.

12. The liquid crystal light deflector of claim 10, further comprising:
an insulating layer disposed on the plurality of pattern electrodes;
a plurality of first via holes formed in the insulating layer in positions respectively corresponding to positions of the $i_{th}$ pattern electrodes of each of the plurality of electrode units;
wherein a via metal fills each of the plurality of first via holes,
wherein the $i_{th}$ line electrode is disposed on the insulating layer, and is connected to the via metal.

13. The liquid crystal light deflector of claim 12, wherein the insulating layer covers the n electrode pads, a plurality of second via holes are formed in the insulating layer in positions respectively corresponding to positions of the n electrode pads, and the n electrode pads are electrically connected to a driving integrated circuit (IC) through the plurality of second via holes.

* * * * *